May 4, 1965 I. BRACH 3,181,716

LEVER-SHOVELLING MACHINES

Filed March 4, 1959 2 Sheets-Sheet 1

May 4, 1965  I. BRACH  3,181,716

LEVER-SHOVELLING MACHINES

Filed March 4, 1959  2 Sheets-Sheet 2

United States Patent Office 3,181,716
Patented May 4, 1965

3,181,716
LEVER-SHOVELLING MACHINES
Ignacy Brach, Pulawska St. 1A–32, Warsaw, Poland
Filed Mar. 4, 1959, Ser. No. 797,274
Claims priority, application Poland, Mar. 5, 1958,
P 88,675; Dec. 24, 1958, P 90,410
3 Claims. (Cl. 214—142)

The hitherto used shovelling machines for shovelling earth are provided with a boom upon which a shovel shank swings about a horizontal pivot and is raised by means of cables. The shovel can be shifted forward by means of a suitable advancing device.

As the shovel shank changes its length at each earth-removing swing of the shovel, each removed ground section differs from that which was last removed as regards its length, the inclination towards the axis of the shovel shank and the cutting angle. Also the forces in the lifting cable change to a large extent and they increase as the shank is pushed forward. Owing to this fact, in case of using a combustion engine, the latter must be chosen so as to meet the maximum stress occurring at the end phase of the earth-cutting process, this stress being the equivalent of that resulting from twice the average power resulting from the cutting and lifting work of the shovel.

A further disadvantage of actual shovelling machines is that, after displacing the machine from one working place to another, the cutting process initially follows a cutting curve having a different shape from that which is the case where the shovel shank is not extended forwardly. As a result of this, the shovelling machine must initially dig itself into the ground when starting to work at a new spot. This causes a loss of time.

In actually built hydraulically actuated shovelling machines, the cutting conditions are highly unfavorable because the cutting angles are very large and decrease continuously, requiring an increase of cutting forces.

The object of the present invention is the construction of a shovelling machine avoiding all the above disadvantages. The cutting process proceeds along a circular or an evolvent arc having a constant or nearly constant and optionally adjustable cutting angle. In a preferred form of the invention, the lever constituting the shovel shank is driven by means of a cam assuring, at a constant force acting on the lifting drum or in the piston of the cylinder, a changing velocity of the shovel motion and an almost constant digging output. This forward movement of the shovel in the direction of the excavation is not made by means of a pushing mechanism during digging, but prior to cutting each lump. This is done according to a strictly determined value corresponding to the thickness of the lump.

Figure 1:
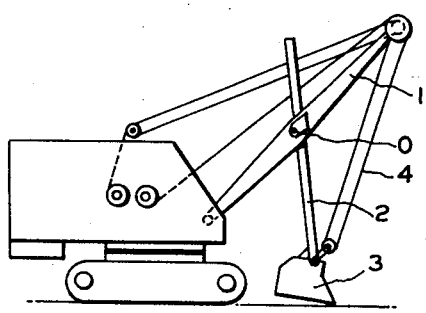
FIG. 1 is a side elevation of a shovelling machine such as is generally used.
Figure 2:
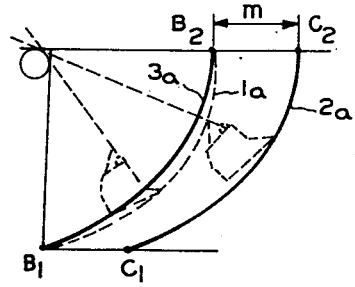
FIG. 2 is a diagrammatic illustration of the operation of the shovelling machine shown in FIG. 1.
Figure 3:
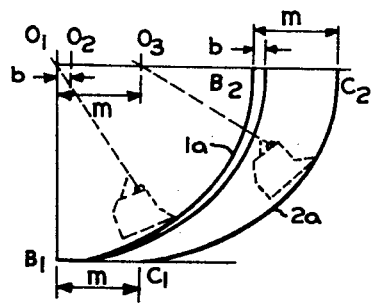
FIG. 3 is a diagrammatic illustration, similar to FIG. 2, showing the operation of a shovelling machine according to the invention.
Figure 5:
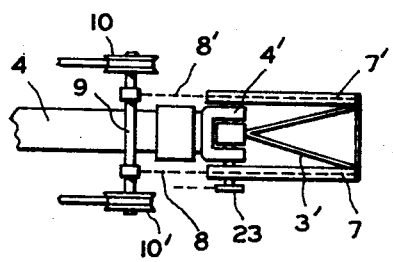
FIG. 5 is a fragmental view illustrating the attachment of the shovel shank to the frame of the shovelling machine shown in FIG. 4, and the flexible drawing element attached thereto for swinging the shovel shank about its horizontal pivot.

Referring now to FIG. 3, the cutting proceeds along a circular arc 1$^a$, the shovel turning about a point $0_1$ and describing the circular arc from the point $B_1$ to the point $B_2$. To cut off a lump of a thickness $b$, the center of rotation of the shovel must be shifted by the same value $b$ to a point $0_2$. Advancement of the shovelling machine is continued in like direction until the center of rotation of the shovel shank is at the point $0_3$, i.e., shifted from the point $0_1$ by the value $m$ corresponding to the maximum shift of the shovel while the machine remains at one working position, the last arc 2$^a$ extending from the point $C_1$ to the point $C_2$.

Figure 4:
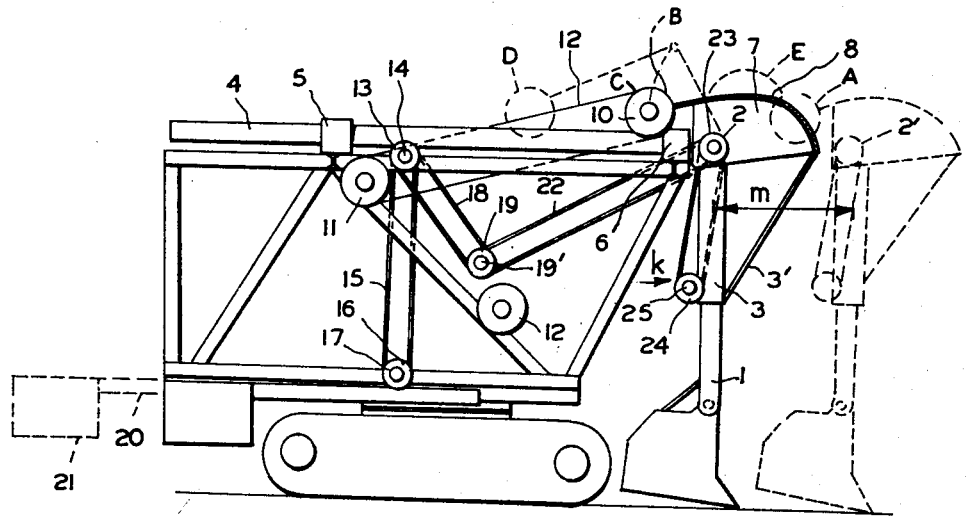
FIG. 4 is a semi-diagrammatic side elevation of a shovelling machine constructed and arranged according to the invention.

The cable driven shovelling machine illustrated in FIG. 4 comprises a shiftable shovel shank 1 and an elongated hollow member 3 which turns about a horizontal pivot which is the center of rotation 2. This center of rotation is designed as an axis mounted in a forklike member 4' of a shiftable beam 4 which is shifted in bearings 5 and 6. About the same center of rotation 2 turn two cams 7 and 7' which are connected by means of suitable draw members 3' with the said member of the shank 3 forming therewith a rigid structure. It will be noted that the cams 7 and 7' extend transversely of and beyond the hollow member 3, and also extend axially of the hollow member for a shorter distance than their transverse extent. From the cams 7 and 7' are wound off cable or chain drawing elements 8 and 8'. There may be only one cam and one drawing element instead of the illustrated two. The drawing elements 8 and 8' are fixed to an axle 9 upon which is mounted the system of cable rolls 10 forming together with the other system of rolls 11 a pulley block system which constitutes the required gear for winding cables upon a drum 12. While the cable is being coiled upon the drum 12, the cable rolls pass from the position C to the position D, and the cams 7 pass from the position A to the position B. It will be apparent that the cams 7 and 7', with the drawing elements 8 and 8' wound upon them, present the shortest lever arm extending from the center of rotation when the cams are in the A position. Furthermore, when in the B position, the cams present the longest lever arm extending from the center of rotation. Thus, the force acting upon the shovel is the smallest when the cams are in the A position, and the greatest when the cams are in the B position.

The displacement of the beam 4 from the position shown in full lines in FIG. 4 forward to the position shown in broken lines with the center of rotation 2 at 2' takes place by means of a special device. To this end, a sprocket wheel 19 actuates a chain 18 to turn a suitable sprocket wheel 13 and the gear wheel 14 connected therewith. The latter engages a rack placed beneath the beam 4. The movement of the sprocket wheel 19 by a determined angle causes the beam 4 to be shifted forward by a determined value which is assumed to be equal to the width of the lump $b$.

As illustrated in FIG. 4, the device for shifting the beam is connected with a device for shifting a counterweight 21 for maintaining stability of the shovelling machine in spite of the piot of the shovel shank being shifted forward. The counterweight is shifted by means of a chain 15 which drives a sprocket wheel 16 and a gear wheel 17 connected therewith. A shiftable frame 20 carries the counterweight 21 and a rack is provided on the shiftable frame for coaction with the gear wheel 17. The diameters of the sprocket wheels and that of the corresponding gear wheels are equal to each other. As a result, the same shift of the counterweight in rearward direction as the shift of the beam 4 with the axle 2 in forward direction is effected. If necessary, of course, a different ratio of shifting can be chosen.

Figure 6:
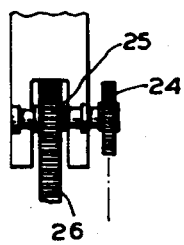
FIG. 6 is a fragmental view showing how the shovel shank of FIG. 4 is elongated and shortened; and, FIG. 7 is a semi-diagrammatic side elevation of a variant form of shovelling machine constructed and arranged according to the invention.

The shovel shank may be elongated correspondingly when the shovel is required to go down into an excavation or for removing a stone. The shift of the telescope-like shovel shank takes place by means of, for instance, a sprocket wheel 19', which is mounted on the same axle as the wheel 19. A driving chain 22 connects the wheel H with a sprocket wheel 23 which is in turn connected to a second sprocket wheel 24 by a chain. The sprocket wheels 23 and 24 are mounted on the elongated hollow member 3. A gear wheel 25 (see FIG. 6) engages a rack 26 positioned upon the shiftable part of the shank 1. Instead of a chain mechanism, a cable mechanism can be used.

In shallow excavations great force developments occur in the lower positions of the shovel. Then it may be advisable to change the shape of the cam to assure longer action arms in the lower positions of the shovel (FIG. 4). For this purpose, either the cams are to be changed or the radii of the curves are to be enlarged in their initial space by means of a suitable screw device.

Figure 7:
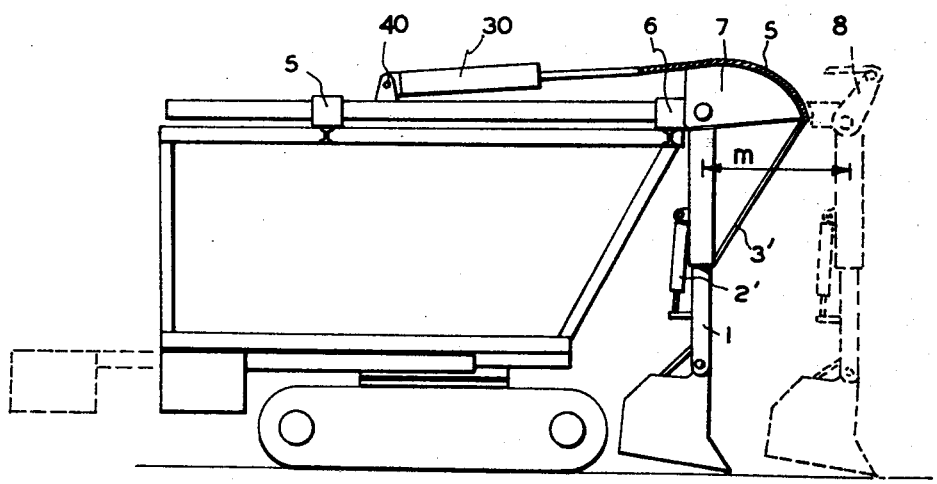

The proposed arrangement of the shovelling machine is especially qualified for hydraulic drive. By means of a cylinder 30 (FIG. 7) swinging about a point 40, it is possible to pull the drawing element 5 and to turn the lever system of the cam 7 with the shank. By means of a second cylinder 2', the part 1 of the shank can be shifted forwardly of the elongated hollow member 3.

In case of using a pump with automatically controlled velocity in dependency upon the pressure in the cylinder or in case of using a direct current in-line motor, the cam 7 can be replaced by a common crank lever 8. As will be evident from FIG. 6, the crank lever 8 is fixed to the elongated hollow member 3 at the horizontal pivot 2 extending away from the frame and away from the shovel.

The horizontal shifting of the rotation axis of the shank by the thickness of the lump, which fact constitutes the most essential feature of the invention, permits the use of this working method in undershot excavators, i.e., digging towards the machine frame.

Inasmuch as the present invention is subject to many modifications and changes in structural details, it is intended that all matter contained in the foregoing description or shown on the drawing, shall be interpreted as illustrative and not in a limiting sense.

I claim:
1. A lever shovelling machine comprising a frame, the bottom member of which frame being in a plane parallel to the plane of the ground upon which the machine stands, a beam slidable forwardly and backwardly with respect to said frame as well as parallel to said bottom member, a pivot mounted on said beam, said pivot being positioned in a plane parallel to said bottom member, a hollow member attached to said pivot and adapted to be pivoted thereabout, a shovel shank slidable axially in said hollow member, a shovel connected to the end of said shovel shank distant from said pivot, in combination with a cam pivoted to said pivot and extending transversely from and beyond said hollow member, a draw member extending from said cam member connected to a point on said cam farthest from said pivot, to the end of said hollow member distant from said pivot, a system carried by said frame for causing said shovel to pivot about said pivot, thereby causing a shoveling operation, and a flexible drawing element connected to said system and to said cam at the same point as said draw member is connected, whereby when the greatest force opposes said shovel, the greatest lever arm about said pivot is created by said cam to said flexible drawing element, and when the smallest force opposes said shovel, the smallest lever arm about said pivot is presented by said cam to said flexible drawing element.

2. A lever shovelling machine according to claim 1 which further includes a gear wheel journalled in said frame beneath said beam meshing with teeth on said beam, whereby the beam can be slid forwardly and rearwardly, a second gear wheel journalled in said elongated hollow member meshing with teeth on said shovel shank, and a sprocket wheel and chain system for operating said second gearwheel, whereby said shovel shank can be advanced or retracted in said hollow member.

3. A lever shovelling machine according to claim 1 which further includes a counterweight frame connected to the lower part of said frame, said counterweight frame being slidable in a plane parallel to said beam, a counterweight mounted on said counterweight frame, a third gear wheel mounted on said frame and meshing with teeth on said counterweight frame, sprocket wheels mounted coaxially to said third gear wheel and said gear wheel and meshing with teeth on said beam, and a sprocket chain connecting said sprocket wheels, whereby said counterweight frame is moved in a direction opposite to said beam to counterbalance the position of said beam.

References Cited in the file of this patent
UNITED STATES PATENTS

| | | |
|---|---|---|
| 1,162,607 | Hoar | Nov. 30, 1915 |
| 1,929,004 | Pugh | Oct. 3, 1933 |
| 2,746,625 | Schwartz et al. | May 22, 1956 |
| 2,827,186 | Waite | Mar. 18, 1958 |
| 2,916,172 | Locke | Dec. 8, 1959 |